(12) United States Patent
Thorstensen et al.

(10) Patent No.: US 11,190,456 B2
(45) Date of Patent: Nov. 30, 2021

(54) REAL-TIME ADJUSTMENT OF PACKET SIZE LIMIT IN VIRTUAL NETWORKS

(71) Applicant: International Business Machines Corporation, Armonk, NY (US)

(72) Inventors: Andrew Thorstensen, Morrisville, NC (US); Adam D. Reznechek, Rochester, MN (US); David M. Koster, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 16/205,882

(22) Filed: Nov. 30, 2018

(65) Prior Publication Data

US 2020/0177516 A1    Jun. 4, 2020

(51) Int. Cl.
*H04L 12/805* (2013.01)
*H04L 12/841* (2013.01)
*H04L 12/835* (2013.01)

(52) U.S. Cl.
CPC .......... *H04L 47/365* (2013.01); *H04L 47/283* (2013.01); *H04L 47/30* (2013.01)

(58) Field of Classification Search
CPC ...... H04L 47/365; H04L 47/283; H04L 47/30
See application file for complete search history.

(56) References Cited

U.S. PATENT DOCUMENTS

| | | | |
|---|---|---|---|
| 6,856,613 B1 * | 2/2005 | Murphy | ............ H04L 29/06027 370/352 |
| 7,355,971 B2 | 4/2008 | Jason, Jr. | |
| 8,804,740 B2 | 8/2014 | Rangaraman | |
| 9,219,579 B2 | 12/2015 | Rao et al. | |
| 9,258,234 B1 * | 2/2016 | Addepalli | ............. H04L 67/142 |
| 2002/0186660 A1 * | 12/2002 | Bahadiroglu | ........... H04L 29/06 370/248 |
| 2006/0067347 A1 * | 3/2006 | Naik | ................... H04L 49/9073 370/412 |
| 2007/0097987 A1 * | 5/2007 | Rey | ........................ H04L 69/28 370/395.52 |
| 2007/0268918 A1 * | 11/2007 | Gopi | ....................... H04L 47/36 370/401 |
| 2011/0216669 A1 * | 9/2011 | Chawla | ................... H04L 12/28 370/254 |

(Continued)

OTHER PUBLICATIONS

Anonymous, "Optimized Migration of a Stream," IP.com Prior Art Database Technical Disclosure, Nov. 4, 2015, IP.com No. IPCOM000244000D, 4 pages.

(Continued)

*Primary Examiner* — Jeffrey M Rutkowski
*Assistant Examiner* — Jasper Kwoh
(74) *Attorney, Agent, or Firm* — Peter J. Edwards

(57) ABSTRACT

A method comprises establishing a packet size limit. The packet size limit may govern the maximum permitted size of packets that are transmitted between a first node and a second node of a network. The method also comprises monitoring a buffer of the second node in the network. The method also comprises determining, based on the monitoring, that the buffer of the second node is filled above an upper capacity threshold. The method also comprises increasing, based on the determining, the first packet size limit.

8 Claims, 7 Drawing Sheets

(56) References Cited

U.S. PATENT DOCUMENTS

| | | | |
|---|---|---|---|
| 2013/0290489 A1* | 10/2013 | Branson | H04L 47/25 709/219 |
| 2014/0301395 A1 | 10/2014 | Khanal et al. | |
| 2015/0257033 A1* | 9/2015 | Manna | H04L 47/28 370/232 |
| 2015/0288603 A1* | 10/2015 | Kandasamy | H04W 28/0257 370/392 |
| 2015/0365357 A1 | 12/2015 | Sreeramoju | |
| 2016/0057070 A1 | 2/2016 | Saxena et al. | |
| 2018/0062964 A1* | 3/2018 | Suzuki | H04L 43/0882 |
| 2019/0281496 A1* | 9/2019 | Turon | H04L 1/1848 |
| 2019/0306072 A1* | 10/2019 | Zhang | H04L 47/36 |
| 2020/0007427 A1* | 1/2020 | Kumar T V | H04L 43/50 |

OTHER PUBLICATIONS

Anonymous, "Fine-Grained Selection of Streaming Application Sub-Graphs for Different Levels of Data Processing Guarantee," IP.com Prior Art Database Technical Disclosure, Mar. 7, 2016, IP.com No. IPCOM000245397D, 3 pages.

Ochotta et al., "Method of Removing Duplicate Messages and Verifying Message Stream Integrity," IP.com Prior Art Database Technical Disclosure, May 12, 2010, IP.com No. IPCOM000195664D, 10 pages.

Srinivasulu et al., "Improving Network I/O Virtualization for Cloud Computing," International Journal of Engineering Research and General Science, vol. 3.4.2, Jul.-Aug. 2015, 3 pages. <http://pnrsolution.org/Datacenter/Vol3/Issue4/180.pdf>.

* cited by examiner

REAL-TIME ADJUSTMENT OF PACKET SIZE LIMIT IN VIRTUAL NETWORKS

BACKGROUND

The present disclosure relates to virtual networking, more particular aspects relate to controlling maximum packet size in virtual networking. In networking, agreed-upon maximum packet sizes establish the maximum size of communications between nodes of a network. Large packet sizes prevent fragmentation of data into several smaller packets. Small packet sizes are faster to assemble than large packet sizes. Depending on the characteristics of two nodes in a network, optimal maximum packet sizes for the communication between those two nodes may not equal the agreed-upon packet size.

SUMMARY

Some embodiments of the present disclosure can also be illustrated as a method comprising establishing a first packet size limit. The first packet size limit may govern the maximum permitted size of packets that are transmitted between a first node and a second node of a network. The method may also comprise monitoring, at a first time, a buffer of the second node in the network. The method may also comprise determining, based on the monitoring, that the buffer of the second node is filled above an upper capacity threshold. The method may increase, based on the determining, the first packet size limit, resulting in a second packet size limit.

Some embodiments of the present disclosure can also be illustrated as a system comprising a processor and a memory in communication with the processor, the memory containing program instructions that, when executed by the processor, are configured to cause the processor to perform a method. The method may comprise establishing a first jitter timer for a virtual network. The first jitter timer may govern maximum amount of time between transmissions from a first node in the virtual network to a second node in the virtual network. The method may also comprise starting the first jitter timer. The method may also comprise commencing the assembly of a data packet at the first node. The method may also comprise determining, before the assembly of the data packet has completed, that the first jitter timer has expired. The method may transmit, in response to the determining, the data packet to the second node. The transmitting may occur before the assembly of the data packet is completed.

Some embodiments of the present disclosure can also be illustrated as a computer program product that comprises a computer readable storage medium having program instructions embodied therewith. The program instructions may be executable by a computer to cause the computer to establish a first packet size limit in a streaming application. The first packet size limit may govern the maximum size of transmissions from a first stream operator to a second stream operator. The program instructions may also be executable by a computer to cause the computer to establish a second packet size limit. The second packet size limit may govern the maximum size of transmissions from a third stream operator to a fourth stream operator. The program instructions may also be executable by a computer to cause the computer to monitor a first set of backpressure metrics of the second stream operator. The program instructions may also be executable by a computer to cause the computer to determine, based on the first set of backpressure metrics, that a first depth of unprocessed tuples of the second stream operator is above an upper threshold. The program instructions may also be executable by a computer to cause the computer to increase, in response to the first depth of unprocessed tuples being above the upper threshold, the first packet size limit. The program instructions may also be executable by a computer to cause the computer to monitor a second set of backpressure metrics of a fourth stream operator. The program instructions may also be executable by a computer to cause the computer to determine, based on the second set of backpressure metrics, that a second depth of unprocessed tuples of the fourth stream operator is below a lower threshold. The program instructions may also be executable by a computer to cause the computer to decrease, in response to the second depth of unprocessed tuples being below the lower threshold, the second packet size limit.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
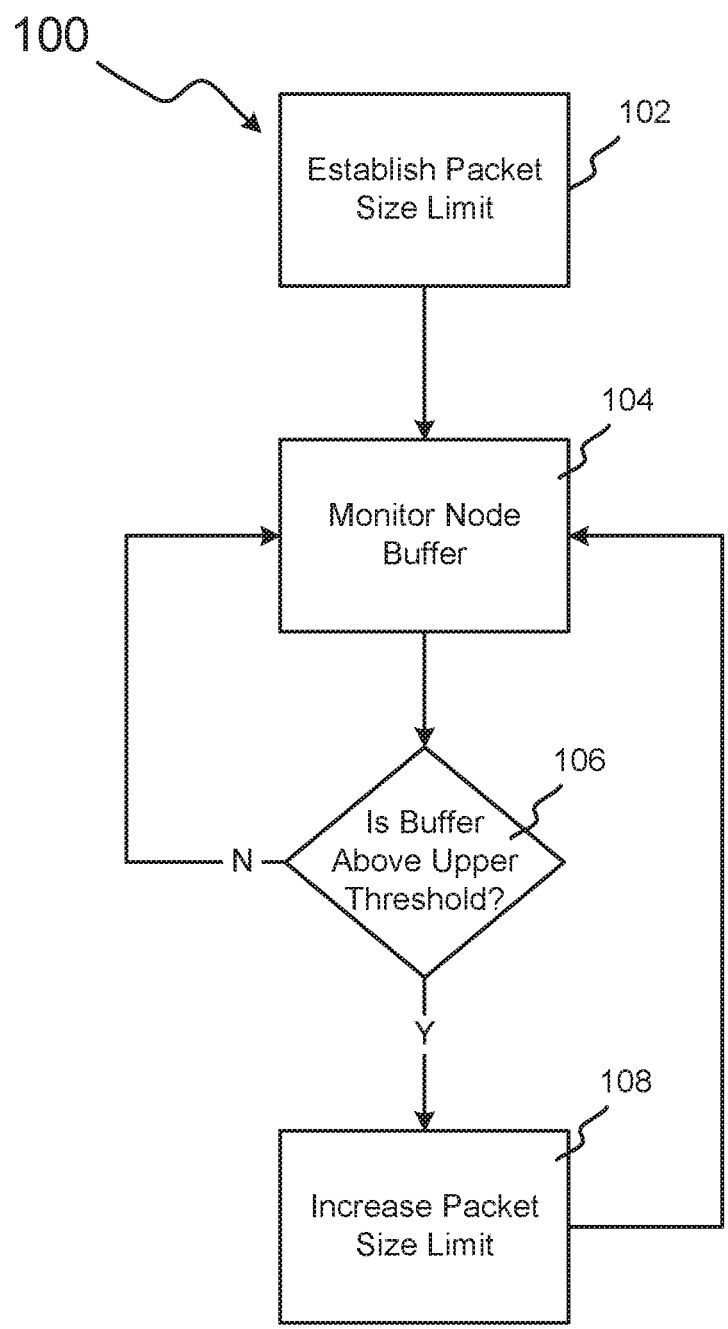
FIG. 1 illustrates an example method of establishing and optimizing a packet-size limit for a virtual network, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtual networking, more particular aspects relate to controlling maximum packet size in virtual networking. While the present disclosure is not necessarily limited to such applications, various aspects of the disclosure may be appreciated through a discussion of various examples using this context.

Typical network communications involve sending data from between nodes of the network (e.g., servers, computers, and mobile devices) in data packets (e.g., Internet protocol packets). These data packets include the data that is intended to be sent (referred to herein as the "packet body" or the "packet payload") as well as header information (referred to herein as the "packet header"). The information in the packet header may serve to, for example, label the data, provide the data's format, and provide information about the data's origin and destination address.

The maximum transmission unit (herein referred to as "MTU") for a node governs the maximum size of a single data communication (herein referred to as a "packet") that the node may transmit to another node over a network. Maximum receive unit (herein referred to as "MRU") for a node, on the other hand, governs the maximum size of a data packet that the node is permitted to accept from another node. For example, the MTU for a server may stipulate that the node may not send a data packet larger than 2000 bytes to another node. The MRU may prevent a client workstation from accepting a packet that is larger than 1500 bytes. Therefore, the MTUs and MRUs of the nodes on a network dictate the size of communications that may be transmitted between those nodes over the network. Together, they govern the maximum packet size for a network.

For many typical networks, some nodes on the network may be owned and controlled by different entities. For those networks, the MTUs and MRUs for the nodes on the network may be established by several different entities. For this reason, the nodes of those network may theoretically have different MTUs and MRUs. For example, if a network contains 5 nodes, there may be 5 different MTUs and 5 different MRUs on the network. In the standards followed by some networks, the MTUs and MRUs of every node in the network may be a limiting factor in the determination of the maximum packet size for a communication between two network nodes. For example, if a network contains 5 nodes, four of those nodes may support packet sizes of 4,000 bytes, but one node may only support packet sizes of 2,000 bytes. In such a network, all data packets may be limited to 2,000 bytes due to the 2,000 byte limitation of one node.

Even in networks that follow less strict standards, MTU-MRU mismatches may still create inefficiencies and make determining the proper maximum packet size difficult. For example, in some networks only the MTUs/MRUs of the nodes and components that fall on the network topology between an origin node and a destination node may be limiting factors in the determination of the maximum packet size for a communication between two network nodes.

This may be illustrated by the previous network with 5 nodes. For example, if the second network node needs to send a data packet to the fourth network node, the packet may travel through the third network node and the fifth network node before reaching the fourth network node. In this scenario, the packet-size limits of the first network node may not be relevant in determining the maximum packet size for this communication. However, in this example network, the second, third, and fourth network nodes all allow packet sizes of 4,000 bytes, but the fifth network node only supports packet sizes up to 2,000 bytes. Thus, even though both the origin node (the second network node) and the destination network node (the fourth network node) both support packet sizes of up to 4,000 bytes, the communication between the second network node and the fourth network node would be limited to data packets of 2,000 bytes because the fifth network node is an intermediary between those first two nodes. Accordingly, even in flexible networks, MTU-MRU mismatches often create difficulties in determining the maximum packet size for communications on the network.

To make MTU-MRU mismatches less likely, typical network protocols support one of two packet sizes: standard packets of 1500 bytes, and jumbo packets of 9000 bytes. This practice may eliminate the need to determine the exact maximum packet sizes supported by the nodes of a network. For example, rather than determining the maximum number of bytes that each node on a network supports, a network controller could simply perform a binary (e.g., YES/NO, TRUE/FALSE) determination of whether the nodes support jumbo packets.

While this standardization of maximum packet sizes increases compatibility between nodes of a network, flexibility of transmission sizes is reduced. For example, some packets may only be slightly larger than a standard packet size of 1500 bytes. For example, an assembled packet for a data file may be 1550 bytes. In this example, if jumbo packets were not supported by both the transmitting node and the receiving node, the packet may be broken into a 1500 byte packet and a 50 byte packet. Depending on the size of the required packet header (based on, for example, the format of the packet header and required information in the packet header), a significant portion of the second packet may be devoted to a second packet header. For example, if the packet headers for the network protocol were 50 bytes, 50% of the second packet would be devoted to the packet header, and 50% of the second packet would be devoted to the final 50 bytes of the data file. Not only would this be inefficient because it wastes packet space, it would also be inefficient because a significant percentage of the processing time devoted to preparing the second packet, transmitting the second packet, receiving the second packet, and processing the second packet would be spent on the packet header, rather than the packet data.

Some nodes in a network may support jumbo packets to mitigate these issues. However, as discussed previously, whether a node supports jumbo packets is determined by the entity that owns or operates that nodes, and thus MTU-MRU mismatches may still occur. As a network increases in size (e.g., as the number of nodes or components in the network topology increases), the likelihood that a node in the network (or any particular path in that network) will not support jumbo packets increases. Thus, in many instances in which standard packet sizes may lead to significant inefficiencies, jumbo packets may not be supported, and it may not be possible to mitigate those inefficiencies.

Further, even in instances in which jumbo packets are supported (e.g., when all nodes in a network support jumbo packets), inefficiencies caused by the use of jumbo packets may be worse than inefficiencies related to standard packet sizes. Because of the large size of jumbo packets, they can take significantly longer than a standard packet to prepare. In some instances, for example, performance loss that results from waiting for an entire jumbo packet to be completed may have a greater negative effect on network communications than the inefficiencies resulting from the use of standard packet sizes.

For example, if a hypothetical data file is 8,000 bytes, it may take a significant amount of time to prepare an 8,000 byte data packet (excluding the file header) containing the file for transmission through the network. If the processing of that file is very time sensitive (e.g., the file contains audio information for a video broadcast) the amount of time that is necessary to prepare the data packet may lead to an unacceptable amount of latency (e.g., the audio playback for the video broadcast may skip or become unintelligible). In these instances, the 8,000 byte data file into could hypothetically be broken into four 2,000 byte blocks and a separate header for each 2,000 byte block could be prepared. Even though this solution would create inefficiencies (e.g., four times as much processing time could be devoted to header preparation), those inefficiencies may be worth the first 2,000 bytes of the file arriving at the destination node earlier while the packets for the remaining 6,000 bytes are being prepared.

Unfortunately, such a solution is not feasible in typical networks, for several reasons. For example, 2,000 bytes is not a standard data packet size, and a typical network that would support a non-standard 2,000 byte packet would likely be negatively impacted by MTU-MRU mismatches. Thus, typical networks that support jumbo packets may not support intermediate packet sizes. While this standardized inflexibility is by imposed purposefully and with overall efficiency in mind, it also can lead to counter-productive inefficiencies, in some instances.

This standardized inflexibility may also result in inefficiencies with very large data files. For example, if a hypothetical data file is slightly over the 9,000 byte limit for a jumbo packet, that data file may be broken into two separate packets (e.g., a 9,000 byte packet, including the header, and a 200 byte packet, including the header). In this instance, a destination node would be required to wait the entire time necessary for the first 9,000 byte packet to be created, but would still not receive the entire data file at once. In this example, a slightly larger maximum packet size (e.g., 9,200 bytes) may be most efficient. In another example, if a hypothetical data file is slightly under 18,000 bytes, two data packets would also be created. In this instance, the destination node would receive the first half of the data file in the first data packet, but may be unable to begin processing the data file until the second data packet with the second half of the data file arrives. In this example, the destination node may be forced to idle while it waits for the second data packet to arrive, rather than working on other processes. In this instance, an 18,000 byte data packet may be most efficient.

As networks have become larger and more complex, and as use cases that require extremely fast transfers between network nodes become more common, these inefficiencies have begun to have a greater and greater effect. The growth of business models built upon platform-as-a-service offerings, for example, may utilize virtual networks that may be composed of many virtual machines that are utilized by clients of the platform owner. The end-user use cases for these virtual machines often require very fast communication between virtual network nodes. However, the precise needs of any virtual-network use case are likely to differ from the precise needs of many other virtual-network use cases. For example, between any two virtual networks, the average file sizes and the standard deviation between file sizes may differ greatly, as well as the virtual network's tolerance for waiting for data between transmissions. Therefore each virtual network may require a different maximum packet size in order to run most efficiently over time. For example, the virtual network that is provided to customer A may run most efficiently with a maximum packet size of 500 bytes, the virtual network provided to customer B may run most efficiently with a maximum packet size of 4,000 bytes, and the virtual network provided to customer C may run most efficiently with a maximum packet size of 20,000 bytes. Further, as the precise uses of a virtual network by an end user evolves, the most efficient maximum packet size for that virtual network may evolve as well.

As a particular example, stream computing is a type of platform-as-a-service offering that may be used to provide real-time processing to large quantities of data by building a network of virtual nodes (e.g., virtual machines) and breaking the data into tuples to be analyzed as the tuples travel through the virtual network (i.e., the stream application). In some embodiments, stream computing may provide users with the ability to analyze a stream of information that is too large to be captured and placed into a final destination (e.g., sensor values from thousands of sensors that will be discarded after being measured could be utilized by a stream computing application to provide detailed analysis). Stream computing may provide the bandwidth to process big-data continuously and in real-time (e.g., generating context from tens of millions of records per second with low latency from record reception to provide meaningful action in microseconds).

By its nature, stream computing is typically offered as a customizable service. In other words, the particulars of the stream application (e.g., the numbers of network nodes, the connections between them, the virtual buffer sizes of each node, and the processing responsibilities of each node) may be customizable for every instance of the streaming application. The streaming application utilized by an end user may bear no resemblance to the streaming application of another end user, or even another streaming application utilized by that same end user. Data flowing through a streaming application may be treated as a continuous stream of tuples, rather than discrete files or data packets. The immediacy needs of any particular node in the streaming application, or of the eventual output of the streaming application, may vary from application to application. In some streaming applications, for example, a continuous stream of very small tuples may be preferred. In other streaming applications, it may be preferred to keep very large tuples together, even if this causes occasional breaks in the stream of tuples at one or more nodes.

For the above exemplary reasons, the inflexibility by which typical networks determine maximum packet size can create significant inefficiencies when applied to virtual networks. This may be particularly true in the case of virtual networks that take the form of streaming applications.

Some embodiments of the present disclosure present new methods of manipulating the maximum packet size for communications on a virtual network. In some embodiments, the buffer or buffers of each network node is monitored by a network controller to determine whether the maximum packet size should be increased or decreased. In some embodiments, the maximum packet size for communications is set for the entire virtual network (e.g., for each node and component of the network) by a virtual network controller. This may be possible by ensuring that all nodes of the virtual network (e.g., virtual machines, stream operators) are controlled by a single network controller (e.g., a virtual network interface controller). In some embodiments, maximum packet size may be set on a per-connection basis. For example, a network controller may set a first maximum packet size between the first two nodes in a network, and a second maximum packet size for the second and third node in a network.

In some embodiments, bundling of smaller packets is forced in order to only send packets that are not significantly smaller than the maximum packet size. In some embodiments, this bundling is limited by a timer based on the network's sensitivity to gaps between transmissions (or receptions) of data.

FIG. 1 illustrates an example method 100 of establishing and maintaining a packet-size limit for a virtual network, in accordance with embodiments. In block 102, a maximum packet-size limit is established. This packet-size limit may be established by a virtual-network controller, rather than by the MTUs or MRUs of the individual nodes in the virtual network. In some embodiments, the virtual-network controller may simultaneously establish the packet-size limit for all nodes in the virtual network. In other embodiments, the virtual-network controller may establish multiple packet-size limits for multiple groups of nodes (e.g., a first packet-size limit for communications between nodes A and B, a second packet-size limit for communications between nodes B and C, and a third packet-size limit for communications between nodes C through F). In some embodiments, the packet-size limit established in block 102 may be very small (e.g., 100 bytes), and may be increased as necessary later in method 100.

In block 104, the network controller monitors buffer information for a node or nodes in the virtual network. In some embodiments, these network nodes may be virtual machines. In some embodiments, these network nodes may be part of a streaming application. In some embodiments, this may involve monitoring the buffer for every node in the network to determine whether any the buffers for any nodes are growing too full (e.g., above a threshold). A buffer that is growing too full, for example, may indicate that the corresponding node is receiving data faster than it can process. In some embodiments, such as in stream-computing applications, this may be referred to as monitoring the backpressure metrics on a node. In these instances, the network controller may determine the depth of unprocessed tuples in the pipeline of unprocessed tuples for a node. In some instances, a buffer at a node may grow full when the node is spending too much time processing header information for data packets. This may occur when the node is receiving many small data packets for which the packet headers take up a proportionally large amount of the packet size.

In block 106, therefore, the network controller determines whether the buffer of the monitored node (or nodes) is above an upper threshold. This upper threshold may be, for example, a percentage of the buffer. For example, a node's buffer may be 1,000 MB. If the upper threshold for that buffer were 75%, the buffer may be filled above that upper threshold if the buffer contains over 750 MB of data. In some embodiments, the upper threshold may be set such that the buffer being filled above the threshold may imply that the node is not able to process the data it is receiving as fast as it is receiving the data. In some such embodiments, the upper threshold may be high enough such that the buffer being filled above the upper threshold may imply that the buffer is in danger of filling completely. In some embodiments, the upper threshold may be set at a lower level, such that the buffer being filled above the upper threshold may not signify that the buffer is in danger of filling completely, but rather simply that the buffer is not in danger of completely emptying. In performance-critical virtual networks, it may be very important to avoid a buffer emptying completely, as a node with an empty buffer could be in danger of running out of data to processes. When a node runs out of data to process, the node may go idle, reducing the overall network's performance.

In some embodiments, a buffer being filled above an upper threshold may signify that increasing the packet size limit would not have a negative effect on the node that corresponds to that buffer. For example, if a buffer were 90% filled, it may signify that the corresponding node would be able to receive data packets less frequently without being in danger of running out of data to process. It may also signify that the corresponding node may benefit from receiving data packets that are composed of a higher percentage of data body (i.e., payload) and a lower percentage of header. This would, in theory, cause the node to spend more processing time on processing packet payloads and less time on processing packet headers for the same amount of data. Therefore, a buffer being filled above an upper threshold may signify to a network controller a need to increase the packet size limit between the monitored node and the preceding node. In some embodiments, this may be performed by increasing only the packet size limit between those two nodes. In other embodiments, this may be performed by increasing the packet size limit for those two nodes and other nodes in the network.

In some embodiments, a network controller may monitor only a single node in block 104 and determine whether the corresponding buffer is filled over an upper threshold in block 106. In these embodiments, the monitored node may be chosen for monitoring, for example, because its state is representative of the average state of the other nodes in the network. In other embodiments, the monitored node may be chosen because it is the most sensitive to gaps between data packets. In some embodiments, a group of some or all of the nodes on the network may be monitored in block 104. In these embodiments, the buffer(s) may be determined to be above the upper threshold, for example, if the buffers of all monitored nodes are above the threshold, if the buffers of at least a certain percentage of the monitored nodes are above threshold, or the aggregate buffer for all nodes is above a threshold percentage (e.g., if the total buffer for all nodes in the virtual network adds up to 2 TB, a network controller may conclude that the buffer is filled above a 50% the threshold if adding up all the data in all the buffers in the network totals at least 1 TB).

If the network controller determines that a buffer is not filled above an upper threshold in block 106, it continues to monitor the node in block 104. However, if the network controller does determine that the buffer is filled above the upper threshold, it may increase the packet size limit for the nodes on the network in block 108. In some embodiments, this may lead to system efficiencies by reducing the percentage of data in the virtual network that is devoted to packet headers. In some embodiments, this may lead to system efficiencies by preventing data packets from being fragmented unnecessarily.

In some embodiments, a network controller may run multiple instances of method 100 independently for multiple nodes in the network. For example, in a network with 10 nodes (e.g., nodes 1-10), a network controller may perform method 100 for each node. If the network controller determines in block 106 that the buffer for node 4 is above a threshold, it may determine to increase the packet size limit in block 108 for communications between node 4 and all nodes that transmit data to node 4. In this example, however, the network controller may not increase the packet size limit in block 108 for any other pair of nodes. Therefore, if nodes 2 and 3 both transmit data to node 4, which transmits data to node 5, the packet size limits for communications between nodes 2 and 4 and between nodes 3 and 4 may be increased in block 108 to 5,000 mB, but the packet size limit between nodes 4 and 5 may remain at 500 mB after the block 108 occurs.

In some embodiments, the amount by which the packet size is increased in block 108 may be in part determined by the extent to which the node or nodes were filled above the upper threshold in block 106. For example, if a node were filled only slightly above the upper threshold, the network controller may only slightly increase the packet size limit (e.g., by 5%) in block 108. If, in another example, the aggregate node buffers were significantly higher than an aggregate upper threshold, the network controller may drastically increase the packet size limit (e.g., by 200%) in block 108.

In some embodiments, after a network controller increases the packet size limit in block 108, the network controller again monitors the node buffer (or buffers) in block 104 to determine whether the increase has had a beneficial effect on network efficiency. In some embodiments, the network controller may determine in a second iteration of block 106 that the node buffer is still filled above an upper threshold, indicating that further efficiencies may be gained by increasing the packet size limit again. Thus, in these instances, the network controller may again increase the packet size limit in block 108.

In this way, a network controller may optimize a virtual network's packet size limit to the specific use case of a virtual network. Because the virtual network controller has the ability to control all the nodes of the network, the virtual network controller may increase the packet size limit for all nodes simultaneously, overriding any MTU or MRU settings. The virtual network controller may also optimize the packet size limit on a per-node-pair basis, such that the packet size limit between every pair of nodes in the network is as large or small as necessary to maximize efficiency of overall communications of the network.

In the embodiments illustrated by FIG. 1, the network controller determines if a buffer or buffers are filled above an upper threshold. However, in some similar embodiments, a network controller may determine whether a buffer or buffers are filled below a lower threshold, and may only increase the packet size limit when the lower threshold is not met. For example, if a lower threshold is set at 70% filled, and a virtual network interface controller determines that buffer for a particular node in the network is under 70% filled, the virtual network interface controller may determine to not increase the packet size limit for communications between that particular node and the node that transmits data to that particular node. However, if the virtual network interface controller determines that the buffer for the particular node is not under 70% filled, the virtual network interface controller may increase the packet size limit in response.

In the embodiments discussed in connection to FIG. 1, a network controller may monitor the buffers on a virtual network (e.g., the unprocessed tuple pipeline depth for a node or multiple nodes) and increase the packet size limit for the nodes in the virtual network in order to reach an efficient packet size limit. However, in some embodiments, it may be beneficial to establish upper and lower thresholds for node buffers in the virtual network, and increase and decrease the packet size limit for the nodes in the network accordingly. This may be beneficial, for example, to accommodate changes in the use of the network (e.g., changes in the design or use of a streaming application) after the packet size limit is customized for the network. This may also be beneficial, for example, to correct changes in the packet size limit that, based on subsequent monitoring of network buffers, increased the packet size limit by too large of an amount. This may prevent, for example, delays associated with network nodes idling as they wait for packets to be processed and transmitted through the network.

This may also be beneficial for updating (in this example, decreasing) the packet size limit for communications between a particular node and the nodes that transmit data to that particular node after that particular node speeds up. For example, a network controller may determine that the buffer for node E is above an upper threshold (e.g., because node E is performing slowly momentarily). The network controller may increase the packet size limit between node E and the nodes that transmit data to node E (e.g., nodes B and C) as a result. However, after node E recovers and speeds back up, the network controller may detect that the buffer for node E drops below a lower threshold, the network controller may decrease the packet size limit for communications between nodes B and E and nodes C and E.

Figure 2:
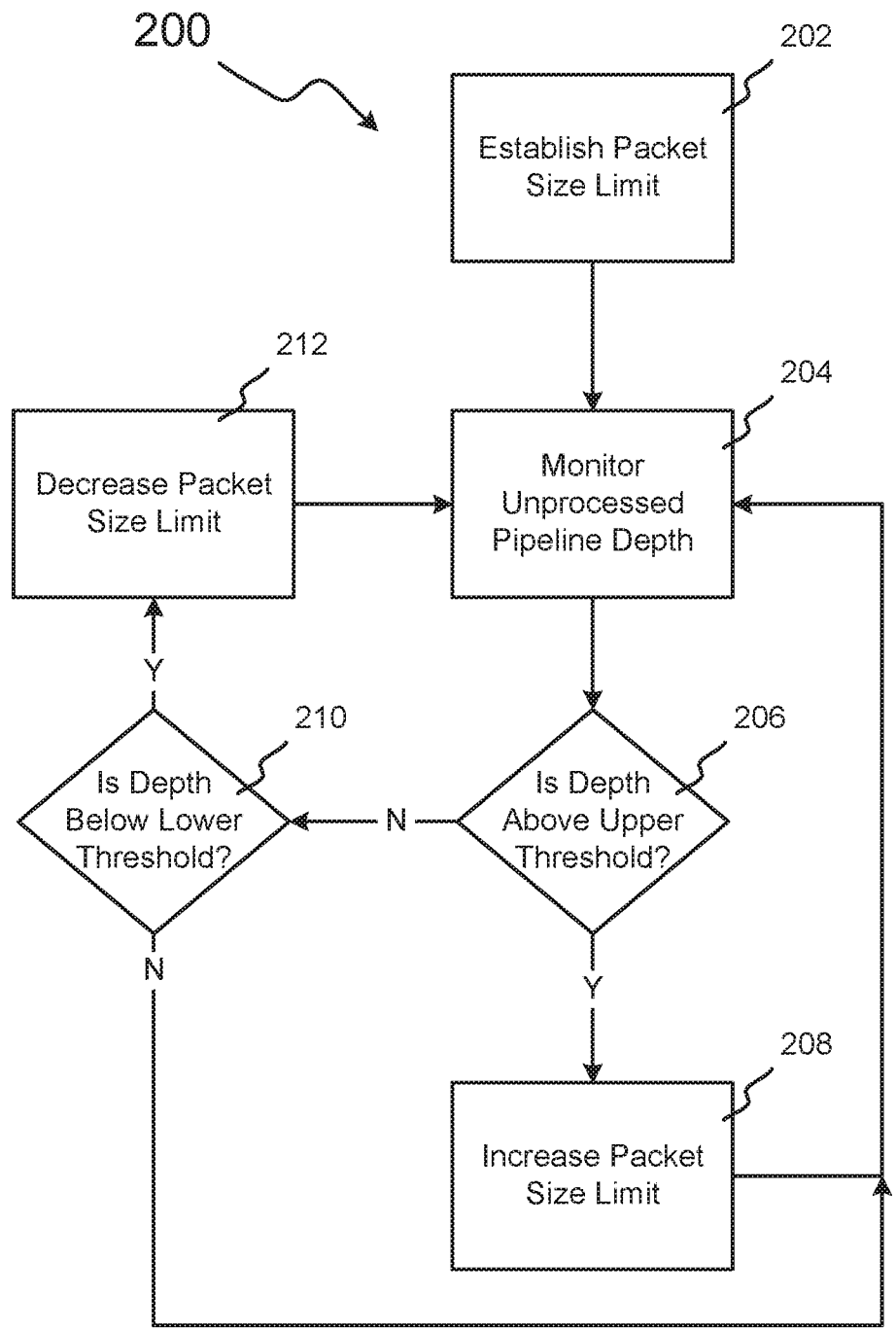
FIG. 2 illustrates an example method of increasing and decreasing the packet size limit for a virtual network based on the data waiting to be processed in that virtual network, in accordance with embodiments.

FIG. 2 illustrates an example method 200 in which a network controller may increase or decrease the packet size limit for the nodes in a virtual network based on the data waiting to be processed in that virtual network. While method 200 is discussed in connection with a virtual network that takes the form of a streaming application, method 200 could also be performed on any virtual network for which a virtual controller has control over the packet size limit for each node on the network. In block 202, the packet size limit for packets passed through the streaming application is established. In some embodiments, this may take the form of establishing a maximum tuple size, whereas in other embodiments, it may take the form of establishing a maximum size of a bundle of tuples. In some embodiments, this packet size limit may be set simultaneously for all nodes in the streaming application. In other embodiments, this packet size limit may only refer to communications between a selection of nodes in the streaming application.

In block 204, the network controller determines the unprocessed tuple pipeline depth. In some embodiments, this may take the form of profiling backpressure metrics from the stream application on one or more nodes. As discussed above, backpressure describes the situation in which a node's buffer is partially filled with tuples because tuples are arriving at the node faster than the node can process the tuples. In some instances, this may occur because a very large number of tuples arrives in a short amount of time, a very large tuple arrives that takes a long time to process, the node is performing complex calculations on a tuple or set of tuples, causing the node to run slowly, or some combination thereof. In these instances, the network controller may determine the depth of unprocessed tuples in the pipeline of unprocessed tuples for a node. Due to the nature of streaming, this may be performed in real time, making near immediate optimizing of the packet size limit for the streaming application possible. Further, because all nodes could be monitored and adjusted independently, this could enable a network controller to optimize the packet size limit between a first group of nodes in the network independently of a second group of nodes in the network, in real time. This may be beneficial to, for example, mitigate localized slowdowns in a network (e.g., a single node or group of nodes slowing down while all other nodes are functioning normally).

In some embodiments, monitoring the unprocessed pipeline depth may determine the number of tuples that is waiting to be processed at each node. In some embodiments, it may determine the total tuple data waiting to be processed. In block 206, the stream application may then determine whether the depth is above an upper threshold. In some embodiments, this upper threshold may be set in order to identify whether the streaming application may benefit from a larger packet size. For example, the threshold may be set to identify large amounts of tuples that are waiting to be processed, which may suggest that the network may be capable of bundling of tuples into larger packets without risking gaps in the tuple stream.

If the depth is above the upper threshold, the network controller may increase the packet size in block 208. In some embodiments, this increased packet size may be applied only to communications between the node that is monitored in block 206 and the nodes that transmit data to that node. In some other embodiments, the increased packet size may be applied to a larger group of nodes, or all nodes in the network. In some embodiments, the increase may take the form of increasing the maximum tuple size, or increasing the maximum size of a bundle of tuples. Once the network controller increases the packet size limit in block 208, it may continue to monitor the unprocessed pipeline depth in block 204. The magnitude of this increase may depend upon the extent to which the depth was determined to be above the upper threshold in block 206. In some embodiments, the magnitude of this increase may also be based on real-time performance metrics of the streaming application. These real-time performance metrics may include, for example, the total amount of time it takes for a tuple to traverse the network, metrics related to nodes of the streaming application idling (e.g., the number of nodes currently idling and aggregate percentage of time the total nodes idled in a recent time window), and the results of the streaming application calculations.

However, if the network controller determines in block 206 (either in a first iteration of block 206 or a subsequent iteration) that the depth is not above the upper threshold, it proceeds to block 210, in which it determines whether the depth is below a lower threshold. In some embodiments, this lower threshold may be set to identify whether the streaming application may benefit from a smaller packet size at the monitored node, at a group of nodes, or throughout the network. For example, the threshold may be set to identify one or more nodes in the virtual network (e.g., virtual machines, compute nodes, processing elements, and stream operators) that are at risk of processing their entire tuple pipeline and idling. These idling nodes may create gaps in the data stream that may not be acceptable for certain streaming-application use cases. In use cases that are particularly sensitive to gaps, the lower threshold may be set to be very risk intolerant and/or be intolerant of risks of large gaps (i.e., significantly high amounts of time that a node is idle). In these use cases, therefore, monitored nodes that display relatively low backpressure (e.g., nodes that operate very quickly, nodes that perform very simple, fast analysis, and nodes that operate on very small tuples) may have a small packet size limit for communications between those monitored nodes and the nodes that transmit information to those monitored nodes.

If the depth is not below the lower threshold in block 210, the network controller proceeds to monitor the unprocessed pipeline depth in block 204. If the depth is below the lower threshold in block 210, however, the network controller decreases the packet size in block 212. The magnitude of this decrease may be based upon the extent to which the depth was below the lower threshold in block 210. The magnitude of this decrease may also be based upon real-time performance metrics of the streaming application.

After the network controller decreases the packet size limit in block 212, the network controller continues to monitor the unprocessed pipeline depth in block 204. In some embodiments, block 204 through block 212 may be performed on a continuous loop in order to continually customize the packet size limit for the developing needs of the streaming application.

In some embodiments, the increases and decreases of the packet size limit in blocks 208 and 212 may be imposed on all nodes of the network immediately. In these embodiments, for example, increasing the pipeline depth may enable downstream nodes to bundle smaller tuples together after they had already been traversing the network. Further, decreasing the packet size limit may require downstream nodes to break up tuples that had already been traversing the network, but that are larger than the decreased packet size limit. In instances in which decreasing a packet size limit may result in fragmenting a tuple or tuple bundle, the network controller may attempt to determine the inefficiency resulting from fragmenting the tuple or tuple bundle (e.g., performance loss due to a second header, potential risk of a downstream node idling while waiting for the second portion of a fragmented tuple, etc.) and compare it to the estimated efficiencies resulting from decreasing the packet size. If the inefficiencies of fragmenting the tuple or tuple bundle are greater than the efficiencies of decreasing the packet size, the network controller may decrease the packet size for the network going forward, but allow the current tuple to proceed without being fragmented. In some embodiments, this may take the form of decreasing the packet size limit only for the nodes to which the tuple or tuple bundle is not estimated to travel through on the way to the destination node. In other embodiments, this may take the form of adding an exception to the tuple.

In the embodiments discussed in connection with FIG. 1 and FIG. 2, maximum packet size for a virtual network is increased or decreased based upon the state of buffers for the nodes in the network. In some embodiments, however, it may be beneficial to control the maximum packet size indirectly based on the virtual network's tolerance for gaps in data passed through the network. These gaps may take the form of latency between the arrival times of data packets (e.g., tuples) at a node. Some use cases of streaming applications may, for example, be very sensitive to any gaps between tuples arriving at the destination node. Streaming applications that broadcast audio or video in real time, for example, may be negatively affected by any significant gap between tuples that are delivered to the destination node. In some embodiments, these gaps may be referred to as jitter, and the tolerance of the virtual network to that jitter may affect the optimal packet size for that virtual network (e.g., the optimal packet size for a streaming application). In some embodiments, a virtual network's tolerance to jitter may affect be used to optimize the packet-size limit on a packet-by-packet basis.

Figure 3:
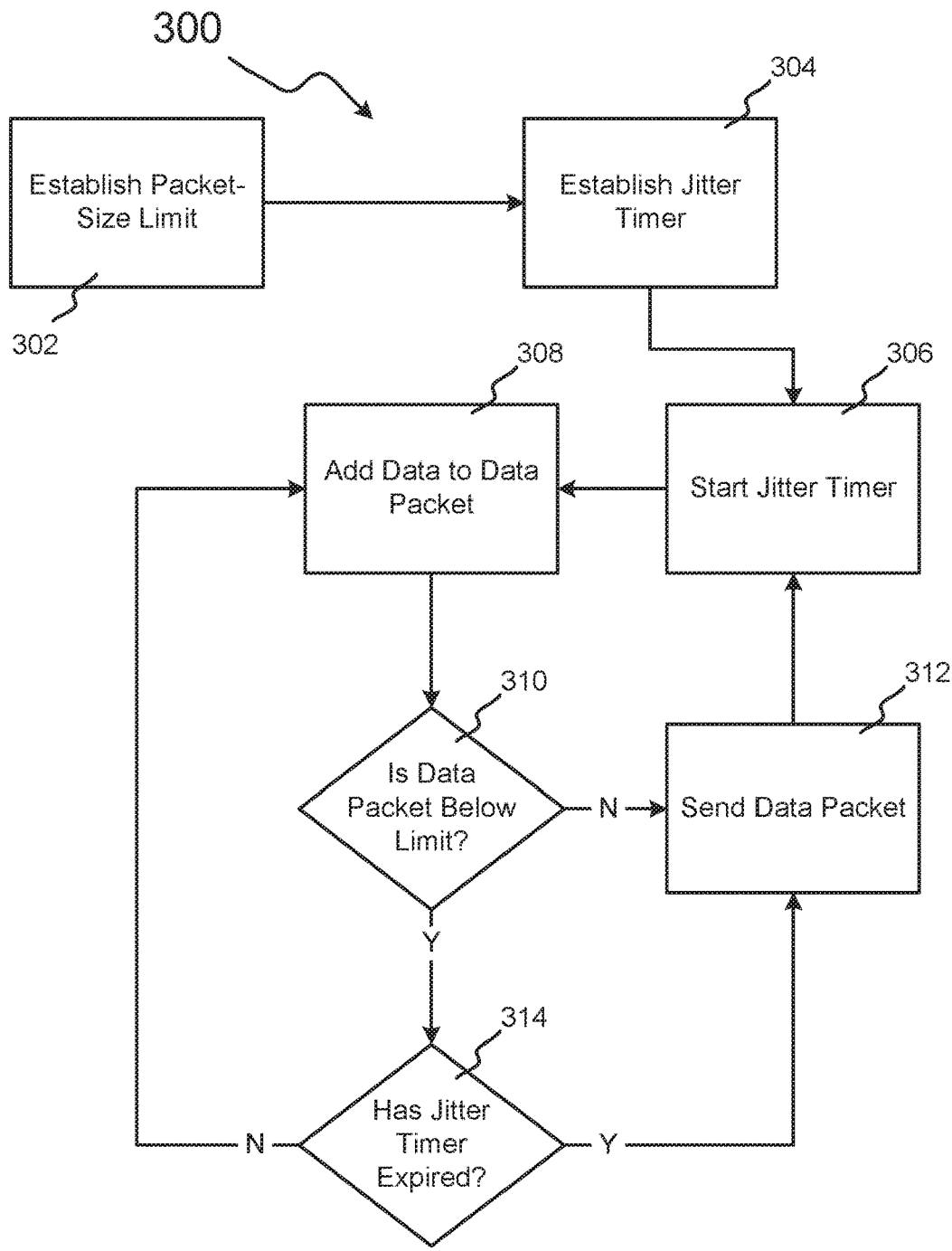
FIG. 3 illustrates an example method of preventing the preparation of large packet sizes from creating jitter in virtual networks that supports bundling of data packets, in accordance with embodiments.

FIG. 3 illustrates an example method 300 by which a network's tolerance to jitter may be utilized to prevent the preparation of large packet sizes from creating jitter in virtual networks that supports bundling of data packets. In method 300, data (e.g., tuples) may be bundled into packets up until a packet size is reached, or a jitter timer expires, whichever occurs earlier. In block 302, a packet size limit for the network is established. In some embodiments, this may occur in a process that is similar to block 102 or block 202, whereas in some embodiments it may occur in a process that is similar to method 100 or method 200. In block 304, the network controller establishes a jitter timer. This jitter timer may take the form of a maximum amount of time between data packets arriving at a node (e.g., a destination node) before the resulting latency creates negative effects on the network (e.g., the application stalling).

In some embodiments, a network controller may be operating a unique instance of method 300 for multiple nodes in a network. For example, in a network with 5 nodes, the network controller may establish multiple unique jitter timers in block 304; one for each node pair in the network. For example, if nodes 3 and 5 were particularly sensitive to delays between receiving tuples (or if the streaming application as a whole were particularly sensitive to delays between receiving tuples at nodes 3 and 5), communications that transmit to nodes 3 and 5 may be assigned a relatively short jitter timer. For example, if node 2 transmits data to nodes 3 and 5, a relatively short jitter timer may be established at node 2 when node 2 is preparing data to be transmitted to either node 3 or node 5. However, if node 4 were not particularly sensitive to delays between receiving tuples (or if the streaming application as a whole were not particularly sensitive to delays between receiving tuples at node 4), communications that transmit to node 4 may be assigned a relatively long jitter timer. For example, if node 1 transmits data to node 4, a relatively long jitter timer may be established at node 1 when node 1 is preparing data to be transmitted to node 4.

After the jitter timer for a particular node is established, the network controller starts the jitter timer in block 306. In some embodiments, this timer may be started when a data packet is sent to a node (sometimes referred to herein as "the receiving node") from another node (sometime referred to herein as a "transmitting node") in the network (e.g., into a streaming application from a source node). In some embodiments, this jitter timer may be started when a data packet is received by a receiving node. In these and other embodiments, the jitter timer may govern when the transmitting node sends a data packet to the receiving node.

The network controller may then begin to add data to a new data packet in block 308. While adding data to the data packet, the network controller determines in block 310 whether the data packet is below the packet size limit. If the data packet is not below the packet size limit, the network controller sends the data packet to the virtual network in block 312. In some embodiments, this may take the form of fragmenting the data packet if the data packet is above the packet size limit, or sending the data packet if it is below the packet size limit, but within a certain percentage of the packet size limit. After the network controller sends the data packet in block 312, the network controller restarts the jitter timer in block 306 and method 300 resumes.

If, however, the network controller determines in block 310 that the data packet is below the packet size limit, the data controller determines in block 314 whether the jitter timer that was started in block 306 has expired. In some embodiments, this may also take the form of determining whether the jitter timer is within a certain percentage of expiring (e.g., if only 10% of the timer's time remains before timer expiration). In other embodiments, this may take the form of determining whether sufficient time remains on the jitter timer to add more data to the data packet, or to complete the data packet.

If the network controller determines in block 314 that the jitter timer has expired, the network controller sends the data packet to the virtual network in block 312. If, however, the network controller determines in block 314 that the jitter timer has not expired, the network controller continues to add data to the data packet in block 308.

While FIG. 3 is illustrated, like FIG. 1 and FIG. 2, as including a packet size limit, in some embodiments the packet sizes on a network may be optimized on a case-by-case bases using solely a jitter timer. This may be beneficial in instances in which network jitter is the main consideration for proper network performance.

Figure 4:
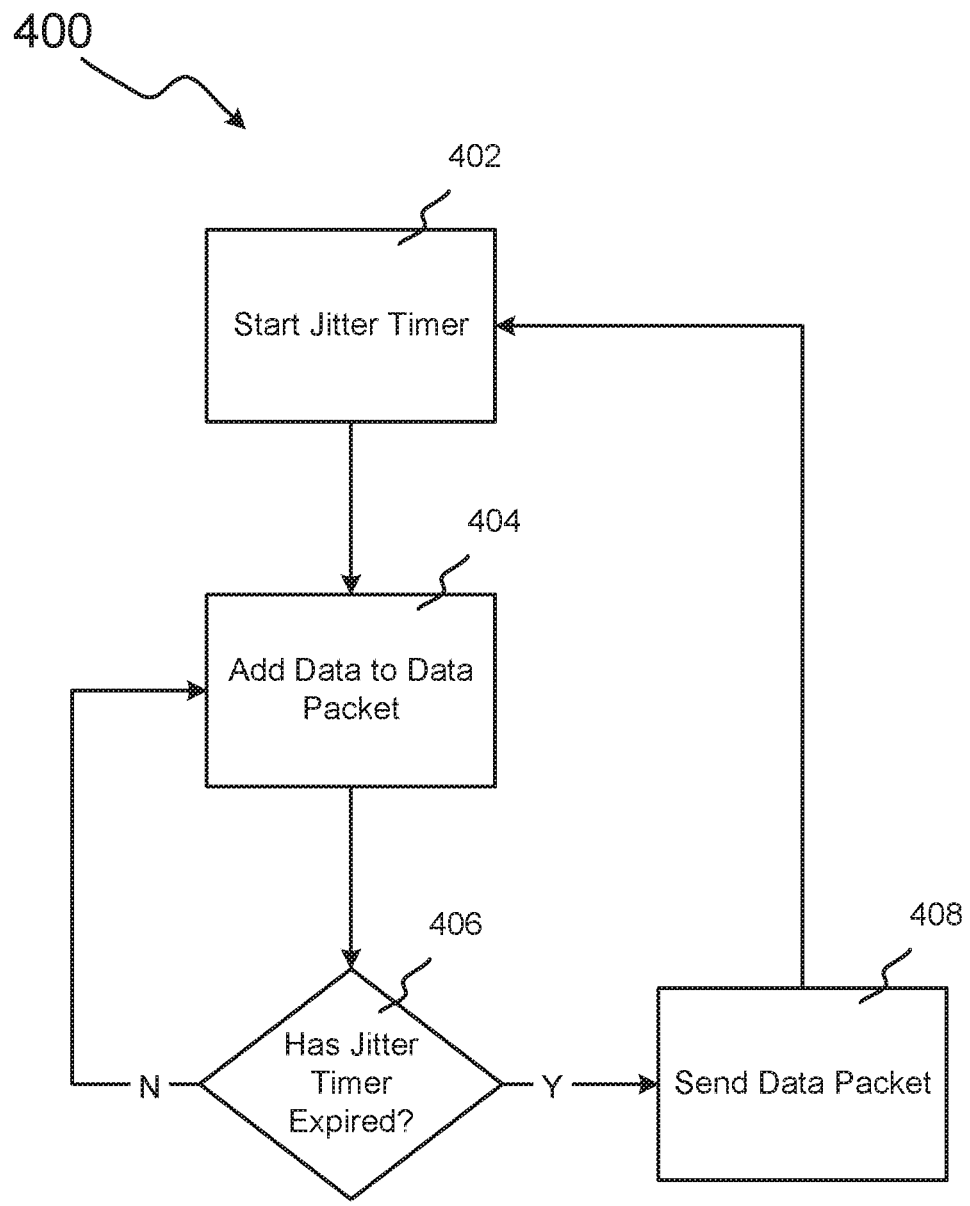
FIG. 4 illustrates an example method in which maximum packet size is determined by the jitter requirements for the network.

FIG. 4 illustrates an example method 400 in which one or more packet sizes is determined solely by one or more jitter requirements for the network. In block 402, the network controller starts a jitter timer. This jitter timer may be based on any latency concerns that relate to the network performance, for one or more than one node (e.g., as discussed in relation to method 300). When the jitter timer has been started, the network controller begins to add data to a new data packet in block 404. As the network controller adds data to the data packet, it determines in block 406 whether the jitter timer has expired. In some embodiments, this determination may take the form of determining whether sufficient time remains on the jitter timer to add more data to the data packet. If the jitter timer has expired, the network controller sends the data packet in block 408. This may take the form of forcing the data packet to flush and transmitting the data packet. The network controller then restarts the jitter timer in block 402. If, however, the network controller determines in block 406 that the jitter timer has not expired, the network controller adds more data to the data packet in block 404.

In some embodiments, as in example method 400, optimizing the jitter timer may be practiced in lieu of optimizing the maximum packet size. For example, in some embodiments, a network controller may either not set a maximum packet size for the nodes in the network, or may set the maximum packet size to a size so large that it is effectively non-limiting (e.g., a packet size of 1 petabyte). In these embodiments, the same network efficiencies that could be gained by optimizing the maximum packet size for a particular network (e.g., for a use case of a streaming application) could be gained by optimizing the jitter timer in real time for the network.

For example, in some embodiments, a network controller may monitor the unprocessed pipeline depth of a streaming application, similar to the operation discussed in block 204 of FIG. 2. However, where the network controller would have increased the packet size limit for communications between a receiving node and a transmitting node based on that monitoring (e.g., where the depth was above an upper threshold), the network controller could, in some embodiments, increase the jitter timer instead. This would allow more data to be bundled into a larger packet before the expiration of the jitter timer. Similarly, where the network controller would have decreased the packet size limit between the receiving node and transmitting node based on that monitoring (e.g., where the depth was below a lower threshold), the network controller could, in some embodiments, decrease the jitter timer instead. This would force bundles of tuples to be sent earlier, creating smaller bundles of tuples throughout the network (i.e., smaller packet sizes).

Figure 5:
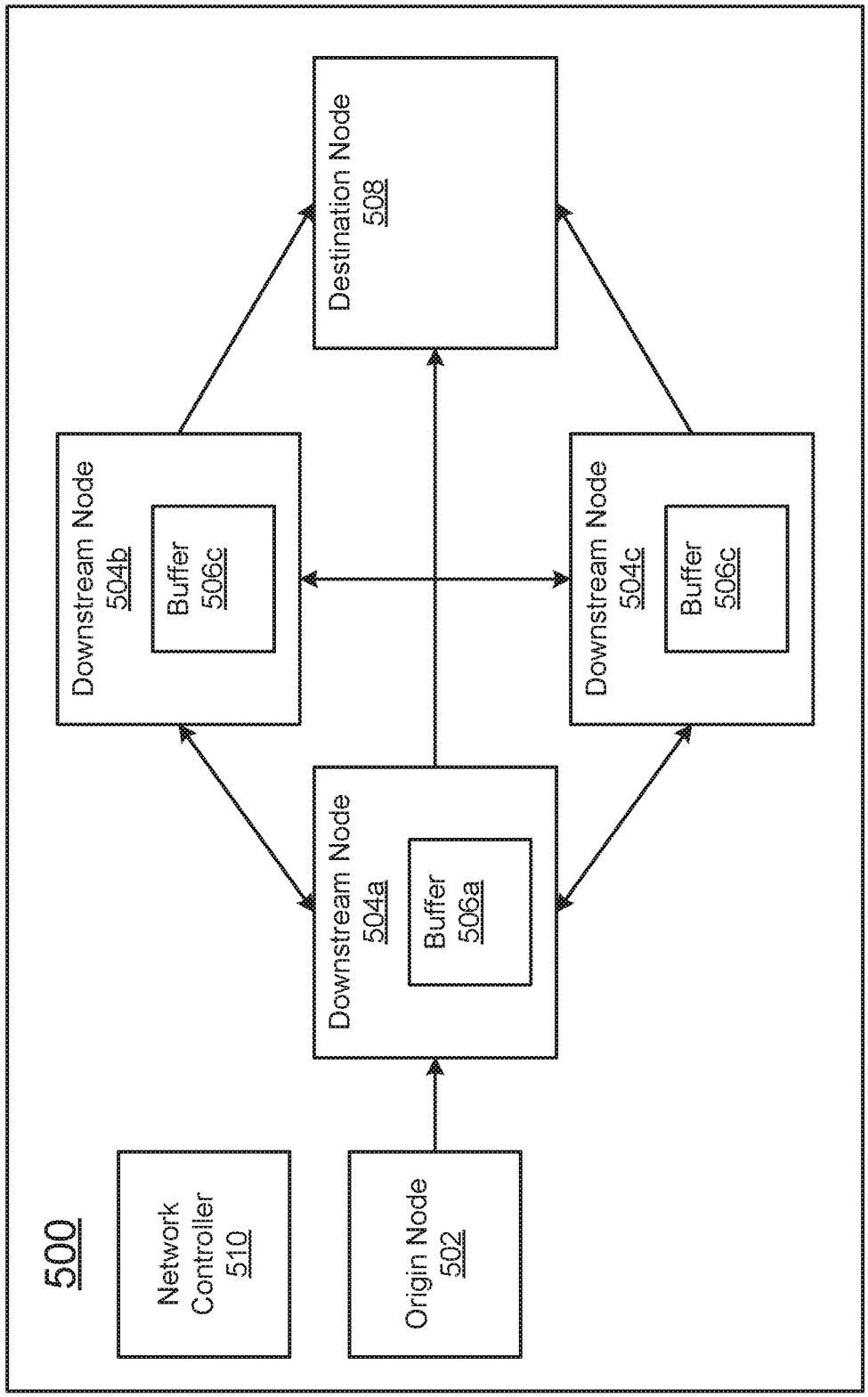
FIG. 5 illustrates an example virtual network in accordance with embodiments.

FIG. 5 illustrates an example virtual network 500 in which the methods of the present disclosure may be practiced. FIG. 5 discloses an origin node, which may be the first node in the virtual network. The origin node may be the node at which data packets are prepared before they are sent to the downstream nodes of the network 500. The origin node 502 may, in some embodiments, prepare single data packets, data packets that are bundles of data, and bundles of tuples. At a certain point, origin node 502 may be instructed to send the data packet to downstream node 504a. This may occur, for example, when the data packet has reached a maximum packet size, or when a jitter timer has expired. In some embodiments, origin node 502 may send very large data packets into the network 500, which are then processed and broken into smaller data packets downstream in the network. In these embodiments, communications in which origin node 502 sends data packets into the network 500 may be assigned a large packet size limit, a long jitter timer, or both. In these embodiments, downstream nodes 504a-504c may be assigned smaller packet size limits, smaller jitter timers, or both.

When the packet has reached downstream node 504a, it may be passed and forth between downstream nodes 504a-504c for transit and processing. These downstream nodes 504a-504c may be virtual machines all running on a single physical computer system, such as a mainframe, workstation, or processor. Each downstream node 504a-504c includes a node buffer, which may store data packets that have been received by the corresponding node and that are waiting to be processed by that node. While FIG. 5 discloses only three downstream nodes 504a-504c, in some embodiments any number of nodes consistent with this disclosure may be present in the network.

In some embodiments, downstream nodes 504a-504c may transmit the data packet to destination node 508. Destination node 508 may be a sink node, such as a node that records the output of the processing performed by downstream nodes 504a-504c. Destination node 508 may also be a virtual node that interfaces with a physical port on a computer system, and may be responsible for transmitting the data packet out to a different physical node on a physical network.

Virtual network 500 discloses network controller 510, which may be a virtual network interface card or a streaming controller. Network controller 510 may monitor the activities of origin node 502, the fill levels of buffers 506a-506c, and may monitor arrival times at the nodes of the network. Network controller 510 may be responsible for establishing maximum packet size for the nodes on the network, optimizing the maximum packet size by increasing and decreasing it, and establishing jitter timers for the network. The physical computer system may include a hypervisor that controls the virtual machines, and may communicate with network controller 510.

Figure 6:
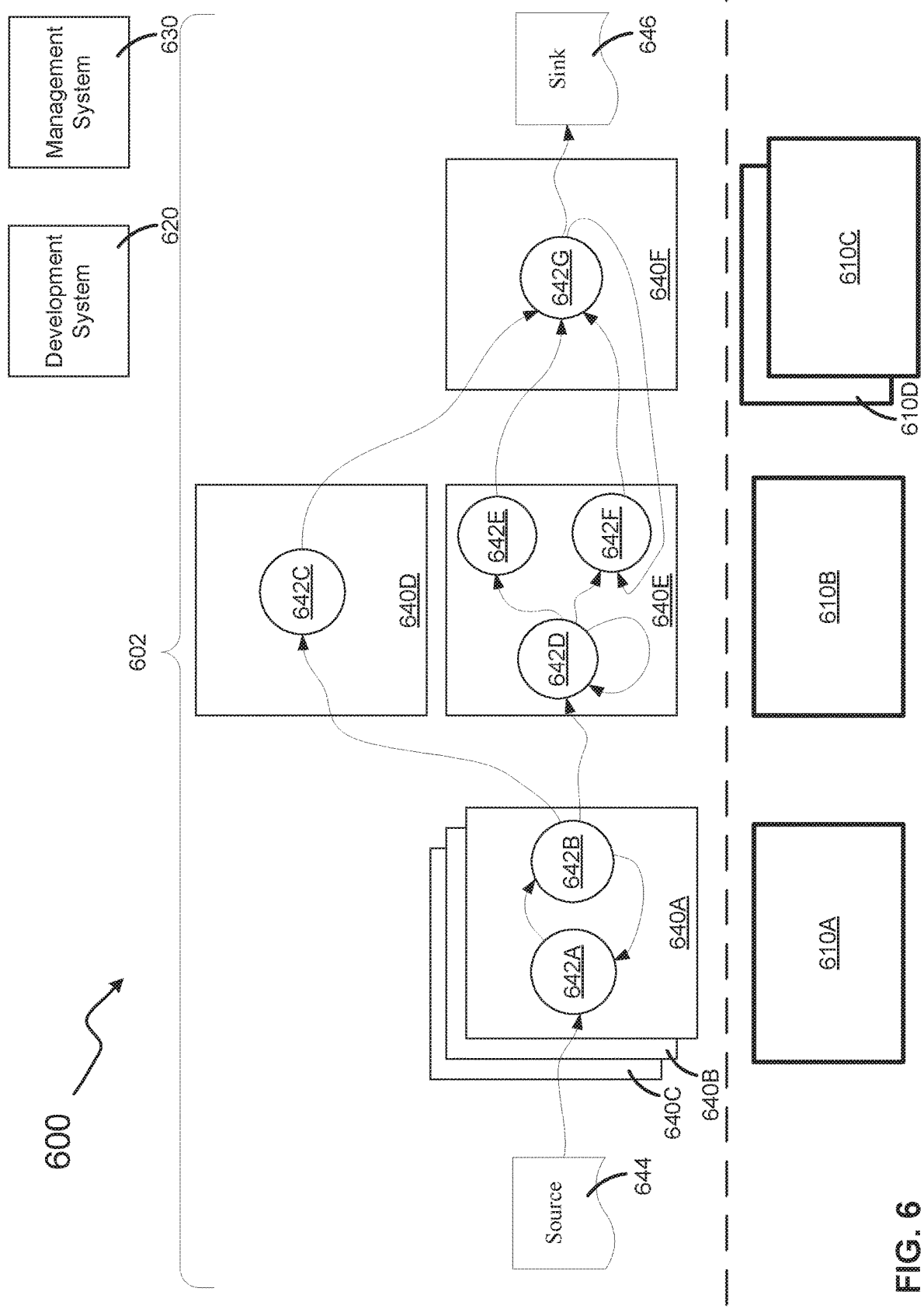
FIG. 6 illustrates a stream computing application in accordance with embodiments.

FIG. 6 depicts a stream computing application (stream application) 600 consistent with embodiments of the present disclosure. The stream application 600 may be represented in the form of an operator graph 602. The operator graph 602 may visually represent to a user the flow of data through the stream application 600. The operator graph 602 may define how tuples are routed through the various components of the stream application 600 (e.g., an execution path). The stream application 600 may include one or more compute nodes 610A, 610B, 610C, and 610D (collectively, 610); a development system 620; a management system 630; one or more processing elements 640A, 640B, 640C, 640D, 640E, and 640F (collectively, 640); and one or more stream operators 642A, 642B, 642C, 642D, 642E, 642F, 642G (collectively, 642). The stream application 600 may receive information from one or more sources 644 and may output information to one or more sinks 646.

It should be appreciated that the stream application 600 depicted in FIG. 6 is for example purposes. Stream applications may vary in the number of compute nodes, processing elements, or stream operators. The stream application may also vary the roles and/or responsibilities performed by any of the components or may include other components not depicted. For example, some or all of the functionality of the development system 620 may be performed by the management system 630. In another example, the functionalities of the development system 620 and the management system 630 may be performed by a singular administrative system (not depicted). The administrative system may be configured to perform these tasks without deviation from the embodiments disclosed herein. In yet another example, the functionalities of the development system 620 and the management system 630 may be performed by a plurality of services (e.g., ten or more individual software programs each configured to perform a specific function).

Figure 7:
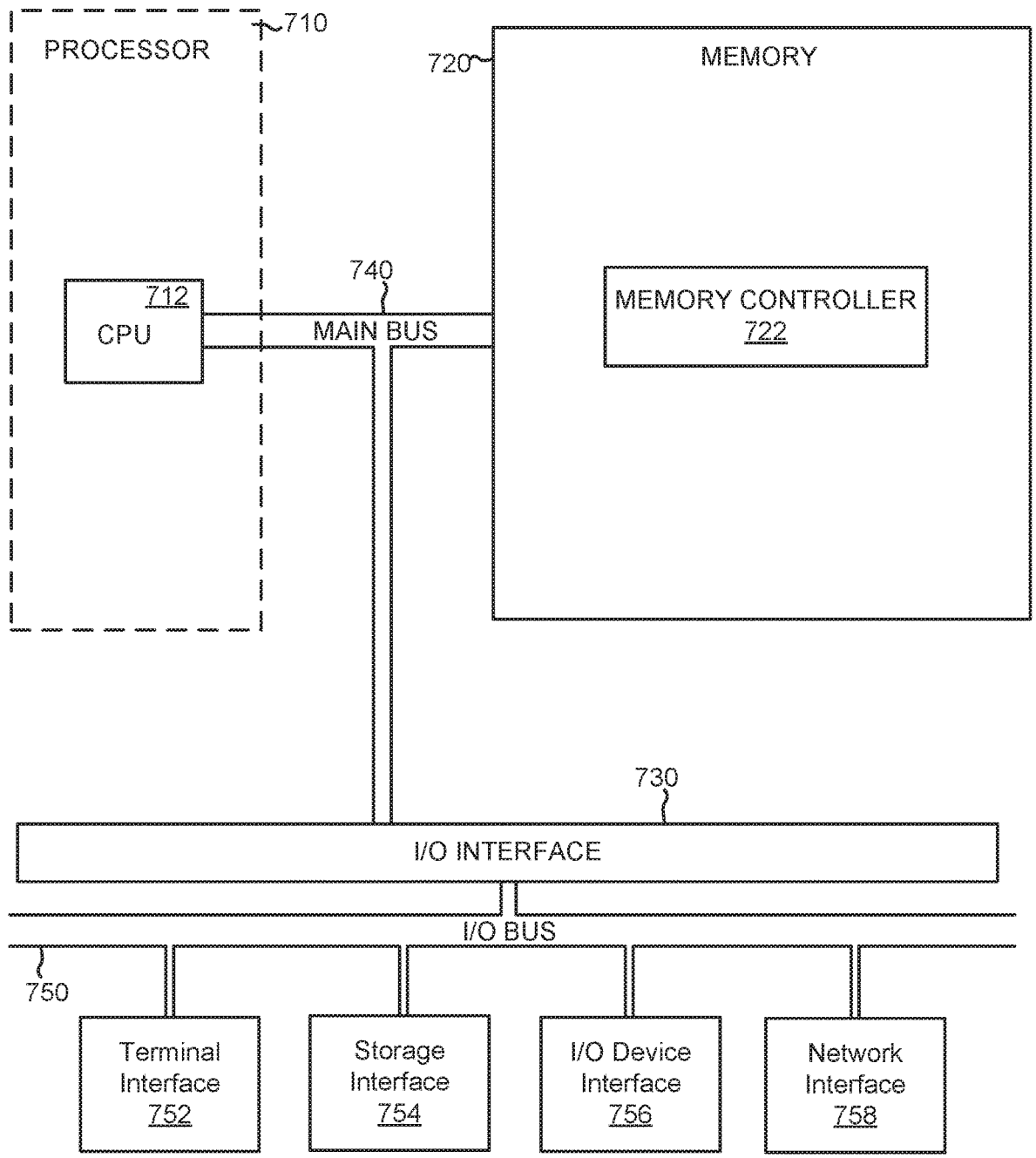
FIG. 7 illustrates the representative major components of an exemplary computer system in accordance with embodiments.

The compute nodes 610 may be computer systems and may each include the following components: a processor, a memory, and an input/output interface (herein I/O). Each compute node 610 may also include an operating system or a hypervisor. In some embodiments, the compute nodes 610 may perform operations for the development system 620, the management system 630, the processing elements 640, and/or the stream operators 642. The compute nodes 610 may be categorized as management hosts, application hosts, or mixed-use hosts. A management host may perform operations for the development system 620 and/or the management system 630. An application host may perform operations for the processing elements 640 and stream operators 642. A mixed-use host may perform operations of both a management host and an application host. FIG. 7 depicts a computer system that may be a compute node consistent with embodiments of the present disclosure.

A network (not depicted) may commutatively couple each of the nodes 610 together (e.g., a local area network, the Internet, etc.). For example, node 610A may communicate with nodes 610B, 610C, and 610D through the network. The computes nodes 610 may communicate with the network by way of the I/O. The network may include a variety of physical communication channels or links. The links may be wired, wireless, optical, or any other suitable media. The network may include a variety of network hardware and software for performing routing, switching, and other functions, such as routers, switches, or bridges. The nodes 610 may communicate through a variety of protocols (e.g., the internet protocol, the transmission control protocol, the file transfer protocol, the hypertext transfer protocol, etc.). In some embodiments, the nodes 610 may share the network with other hardware, software, or services (not depicted).

The development system 620 may provide a user with the ability to create a stream application that is targeted to process specific sets of data. The development system 620 may operate on a computer system (not depicted), such as the computer system depicted in FIG. 7. The development system 620 may operate on one or more of the compute nodes 610. The development system 620 may generate one or more configuration files that describes the stream computing application 600 (e.g., the processing elements 640, the stream operators 642, the sources 644, the sinks 646, the assignment of the aforementioned to the compute nodes 610, etc.). The development system 620 may receive requests from a user to generate the stream application 600. The development system 620 may receive requests from a user to generate other stream applications (not depicted). The development system 620 may communicate with the management system 630 to pass along the configuration on any stream applications it creates.

The development system 620 may generate the configuration by considering the performance characteristics of the software components (e.g., the processing elements 640, the stream operators 642, etc.) the hardware (e.g., the compute nodes 610, the network) and the data (e.g. the sources 644, the format of the tuples, etc.). In a first example, the development system 620 may determine that the overhead of running processing elements 640A, 640B, and 640C together on compute node 610A results in better performance than running them on separate compute nodes. The performance may be better because of a latency incurred by running processing elements 640A, 640B, and 640C across the network between compute nodes 610A and 610B. In a second example, the development system 620 may determine that the memory footprint of placing stream operators 642C, 642D, 642E, and 642F into a single processing element 640E is larger than the cache of a first processor in compute node 610B. To preserve memory space inside the cache of the first processor the development system 620 may decide to place only the stream operators 642D, 642E, and 642F into a single processing element 640E despite the inter-process communication latency of having two processing elements 640D and 640E.

In a third example of considering the performance characteristics, the development system 620 may identify a first operation (e.g., an operation being performed on processing element 640F on compute node 610C) that requires a larger amount of resources within the stream application 600. The development system 620 may assign a larger amount of resources (e.g., operating the processing element 640F on compute node 610D in addition to compute node 610C) to aid the performance of the first operation. The development system 620 may identify a second operation (e.g., an operation being performed on processing element 640A) that requires a smaller amount of resources within the stream application 600. The development system 620 may further determine that the stream application 600 may operate more efficiently through an increase in parallelization (e.g., more instances of processing element 640A). The development system 620 may create multiple instances of processing element 640A (e.g., processing elements 640B and 640C). The development system 620 may then assign processing elements 640A, 640B, and 640C to a single resource (e.g., compute node 610A). Lastly, the development system 620 may identify a third operation and fourth operation (e.g., operations being performed on processing elements 640D and 640E) that each require low levels of resources. The development system 620 may assign a smaller amount of resources to the two different operations (e.g., having them share the resources of compute node 610B rather than each operation being performed on its own compute node).

The development system 620 may include a compiler (not depicted) that compiles modules (e.g., processing elements 640, stream operators 642, etc.). The modules may be source code or other programmatic statements. The modules may be in the form of requests from a stream processing language (e.g., a computing language containing declarative statements allowing a user to state a specific subset from information formatted in a specific manner). The compiler may translate the modules into an object code (e.g., a machine code targeted to the specific instruction set architecture of the compute nodes 610). The compiler may translate the modules into an intermediary form (e.g., a virtual machine code). The compiler may be a just-in-time compiler that executes as part of an interpreter. In some embodiments, the compiler may be an optimizing compiler. In some embodiments, the compiler may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The management system 630 may monitor and administer the stream application 600. The management system 630 may operate on a computer system (not depicted), such as the computer system depicted in FIG. 7. The management system 630 may operate on one or more of the compute nodes 610. The management system 630 may also provide the operator graph 602 of the stream application 600. The management system 630 may host the services that make up the stream application 600 (e.g., services that monitor the health of the compute nodes 610, the performance of the processing elements 640 and stream operators 642, etc.). The management system 630 may receive requests from users (e.g., requests to authenticate and authorize users of the stream application 610, requests to view the information generated by the stream application, requests to view the operator graph 602, etc.).

The management system 630 may provide a user with the ability to create multiple instances of the stream application 600 configured by the development system 620. For example, if a second instance of the stream application 600 is required to perform the same processing, then the management system 630 may allocate a second set of compute nodes (not depicted) for performance of the second instance of the stream application. The management system 630 may also reassign the compute nodes 610 to relieve bottlenecks in the system. For example, as shown, processing elements 640D and 640E are executed by compute node 610B. Processing element 640F is executed by compute nodes 610C and 610D. In one situation, the stream application 600 may experience performance issues because processing elements 640D and 640E are not providing tuples to processing element 640F before processing element 640F enters an idle state. The management system 630 may detect these performance issues and may reassign resources from compute node 610D to execute a portion or all of processing element 640D, thereby reducing the workload on compute node 610B. The management system 630 may also perform operations of the operating systems of the compute nodes 610, such as the load balancing and resource allocation of the processing elements 640 and stream operators 642. By performing operations of the operating systems, the management system 630 may enable the stream application 600 to more efficiently use the available hardware resources and increase performance (e.g., by lowering the overhead of the operating systems and multiprocessing hardware of the compute nodes 610).

The processing elements 640 may perform the operations of the stream application 600. Each of the processing elements 640 may operate on one or more of the compute nodes 610. In some embodiments, a given processing element 640 may operate on a subset of a given compute node 610, such as a processor or a single core of processor of a compute node 610. In some embodiments, a given processing element 640 may operate on multiple compute nodes 610. The processing elements 640 may be generated by the development system 620. Each of the processing elements 640 may be in the form of a binary file and additionally library files (e.g., an executable file and associated libraries, a package file containing executable code and associate resources, etc.).

Each of processing elements 640 may include configuration information from the development system 620 or the management system 630 (e.g., the resources and conventions required by the relevant compute node 610 to which it has been assigned, the identity and credentials necessary to communicate with the sources 644 or sinks 646, the identity and credentials necessary to communicate with other processing elements, etc.). Each of the processing elements 640 may be configured by the development system 620 to run optimally upon one of the compute nodes 610. For example, processing elements 640A, 640B, and 640C may be compiled to run with optimizations recognized by an operating system running on compute node 610A. The processing elements 640A, 640B, and 640C may also be optimized for the particular hardware of compute node 610A (e.g., instruction set architecture, configured resources such as memory and processor, etc.).

Each of processing elements 640 may include one or more stream operators 642 that perform basic functions of the stream application 600. As streams of tuples flow through the processing elements 640, as directed by the operator graph 602, they pass from one stream operator to another (e.g., a first processing element may process tuples and place the processed tuples in a queue assigned to a second processing element, a first stream operator may process tuples and write the processed tuples to an area of memory designated to a second stream operator, tuples after processing may not be moved but may be updated with metadata to signify they are ready for processing by a new processing element or stream operator, etc.). Multiple stream operators 642 within the same processing element 640 may benefit from architectural efficiencies (e.g., reduced cache missed, shared variables and logic, reduced memory swapping, etc.). The processing elements 640 and the stream operators 642 may utilize inter-process communication (e.g., network sockets, shared memory, message queues, message passing, semaphores, etc.). The processing elements 640 and the stream operators 642 may utilize different inter-process communication techniques depending on the configuration of the stream application 600. For example: stream operator 642A may use a semaphore to communicate with stream operator 642B; processing element 640A may use a message queue to communicate with processing element 640C; and processing element 640B may use a network socket to communicate with processing element 640D.

The stream operators 642 may perform the basic logic and operations of the stream application 600 (e.g., processing tuples and passing processed tuples to other components of the stream application). By separating the logic that would conventionally occur within a single larger program into basic operations performed by the stream operators 642, the stream application 600 may provide greater scalability. For example, tens of compute nodes hosting hundreds of stream operators in a stream application may enable processing of millions of tuples per second. The logic may be created by the development system 620 before runtime of the stream application 600. In some embodiments, the sources 644 and the sinks 646 may also be stream operators 642. In some embodiments, the sources 644 and the sinks 646 may link multiple stream applications together (e.g., the sources 644 could be sinks for a second stream application and the sinks 646 could be sources for a third stream application). The stream operators 642 may be configured by the development system 620 to optimally perform the stream application 600 using the available compute nodes 610. The stream operators may 642 send and receive tuples from other stream operators. The stream operators 642 may receive tuples from the sources 644 and may send tuples to the sink 646.

The stream operators 642 may perform operations (e.g., conditional logic, iterative looping structures, type conversions, string formatting, etc.) upon the attributes of a tuple. In some embodiments, each stream operator 642 may perform only a very simple operation and may pass the updated tuple on to another stream operator in the stream application 600—simple stream operators may be more scalable and easier to parallelize. For example, stream operator 642B may receive a date value to a specific precision and may round the date value to a lower precision and pass the altered date value to stream operator 642D that may change the altered date value from a 24-hour format to a 12-hour format. A given stream operator 642 may not change anything about a tuple. The stream operators 642 may perform operations upon a tuple by adding new attributes or removing existing attributes.

The stream operators 642 may perform operations upon a stream of tuples by routing some tuples to a first stream operator and other tuples to a second stream operator (e.g., stream operator 642B sends some tuples to stream operator 642C and other tuples to stream operator 642D). The stream operators 642 may perform operations upon a stream of tuples by filtering some tuples (e.g., culling some tuples and passing on a subset of the stream to another stream operator). The stream operators 642 may also perform operations upon a stream of tuples by routing some of the stream to itself (e.g., stream operator 642D may perform a simple arithmetic operation and as part of its operation it may perform a logical loop and direct a subset of tuples to itself). In some embodiments, a particular tuple output by a stream operator 642 or processing element 640 may not be considered to be the same tuple as a corresponding input tuple even if the input tuple is not changed by the stream operator or the processing element.

FIG. 7 depicts the representative major components of an exemplary Computer System 701 that may be used in accordance with embodiments of the present disclosure. The particular components depicted are presented for the purpose of example only and are not necessarily the only such variations. The Computer System 701 may comprise a Processor 710, Memory 720, an Input/Output Interface (also referred to herein as I/O or I/O Interface) 730, and a Main Bus 740. The Main Bus 740 may provide communication pathways for the other components of the Computer System 701. In some embodiments, the Main Bus 740 may connect to other components such as a specialized digital signal processor (not depicted).

The Processor 710 of the Computer System 701 may be comprised of one or more CPUs 712. The Processor 710 may additionally be comprised of one or more memory buffers or caches (not depicted) that provide temporary storage of instructions and data for the CPU 712. The CPU 712 may perform instructions on input provided from the caches or from the Memory 720 and output the result to caches or the Memory 720. The CPU 712 may be comprised of one or more circuits configured to perform one or methods consistent with embodiments of the present disclosure. In some embodiments, the Computer System 701 may contain multiple Processors 710 typical of a relatively large system. In other embodiments, however, the Computer System 701 may be a single processor with a singular CPU 712.

The Memory 720 of the Computer System 701 may be comprised of a Memory Controller 722 and one or more memory modules for temporarily or permanently storing data (not depicted). In some embodiments, the Memory 720 may comprise a random-access semiconductor memory, storage device, or storage medium (either volatile or non-volatile) for storing data and programs. The Memory Controller 722 may communicate with the Processor 710, facilitating storage and retrieval of information in the memory modules. The Memory Controller 722 may communicate with the I/O Interface 730, facilitating storage and retrieval of input or output in the memory modules. In some embodiments, the memory modules may be dual in-line memory modules.

The I/O Interface 730 may comprise an I/O Bus 750, a Terminal Interface 752, a Storage Interface 754, an I/O Device Interface 756, and a Network Interface 758. The I/O Interface 730 may connect the Main Bus 740 to the I/O Bus 750. The I/O Interface 730 may direct instructions and data from the Processor 710 and Memory 720 to the various interfaces of the I/O Bus 750. The I/O Interface 730 may also direct instructions and data from the various interfaces of the I/O Bus 750 to the Processor 710 and Memory 720. The various interfaces may comprise the Terminal Interface 752, the Storage Interface 754, the I/O Device Interface 756, and the Network Interface 758. In some embodiments, the various interfaces may comprise a subset of the aforementioned interfaces (e.g., an embedded computer system in an industrial application may not include the Terminal Interface 752 and the Storage Interface 754).

Logic modules throughout the Computer System 701—including but not limited to the Memory 720, the Processor 710, and the I/O Interface 730—may communicate failures and changes to one or more components to a hypervisor or operating system (not depicted). The hypervisor or the operating system may allocate the various resources available in the Computer System 701 and track the location of data in Memory 720 and of processes assigned to various CPUs 712. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   establishing a first packet size limit, wherein the first packet size limit governs the maximum permitted size of packets that are allowed to be transmitted between a first node and a second node of a network;
   monitoring, at a first time, a buffer of the second node in the network;
   determining, based on the monitoring, that the buffer of the second node is filled above an upper capacity threshold; and
   increasing, based on the determining, the first packet size limit, resulting in a second packet size limit.

2. The method of claim 1, further comprising:
   establishing a third packet size limit, wherein the first packet size limit governs the maximum permitted size of packets that are transmitted between the second node and a third node of the network and wherein the third packet size limit is smaller than the second packet size limit;
   monitoring, at the first time, the buffer of the third node in the network;
   determining, based on the monitoring, that the buffer of the third node is filled below a lower-capacity threshold; and
   decreasing, based on the determination that the buffer of the third node is filled below a lower-capacity threshold, the third packet size limit, resulting in a fourth packet size limit.

3. The method of claim 1, further comprising:
   monitoring, at a second time, the buffer of the second node, wherein the second time is after the first time;
   determining, based on the monitoring at the second time, that the buffer of the second node is still filled above the upper capacity threshold; and
   increasing, based on the determination that the buffer of the second node is still filled above the upper capacity threshold, the second packet size limit, resulting in a fifth packet size limit.

4. The method of claim 1, further comprising:
   adding, at the first node and after the increasing, a first set of data to a first data packet;
   identifying, after the adding, that the first data packet is below the second packet size limit;
   bundling, based on the identifying, a second set of data to the first data packet;
   receiving, after the bundling, a notification that a first jitter timer has expired; and
   transmitting, based on the receiving, the first data packet to the second node;
   wherein the first data packet is below the second packet size limit at the time of the transmitting.

5. The method of claim 1, further comprising:
   establishing a first acceptable jitter value, wherein the first acceptable jitter value describes a tolerance to gaps between communications that are delivered to the second node; and
   establishing, based on the acceptable jitter value, a second jitter timer, wherein the second jitter timer governs the maximum amount of time between transmission from the first node to the second node.

6. The method of claim 1, further comprising:
   monitoring, at a third time, the buffer of the first node;
   determining, based on the monitoring at the third time, that the buffer of the first node is filled below a lower capacity threshold; and
   decreasing, based on the determination that the buffer of the first node is filled below a lower capacity threshold, the second packet size limit, resulting in a sixth packet size limit.

7. The method of claim 6, wherein the sixth packet size limit is greater than the first packet size limit.

8. The method of claim 1, wherein the monitoring comprises determining whether the depth of unprocessed tuples in the node's buffer is above a threshold.

* * * * *